Aug. 15, 1967  B. E. BUSKING  3,335,690
FLOATING STORAGE UNIT FOR A FLUID
Filed Feb. 4, 1966
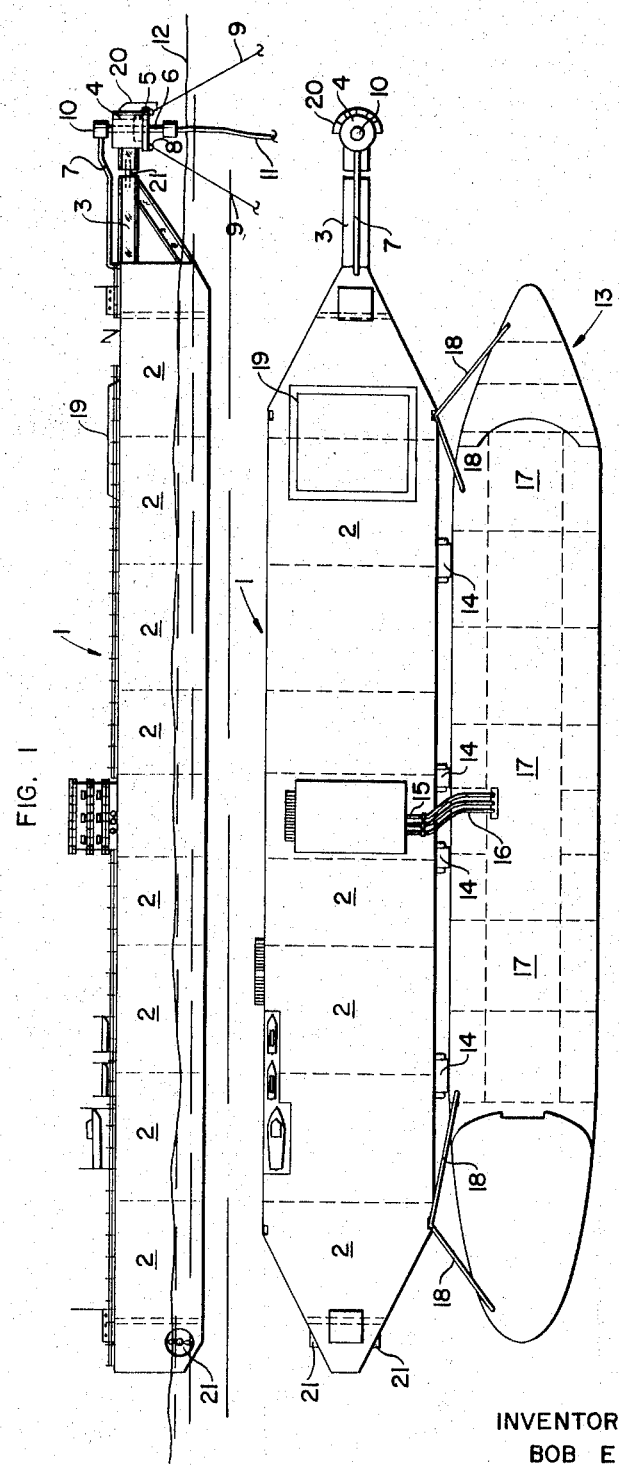
INVENTOR:
BOB E. BUSKING
BY: Oswald H. Milmore
HIS ATTORNEY

United States Patent Office 3,335,690
Patented Aug. 15, 1967

3,335,690
FLOATING STORAGE UNIT FOR A FLUID
Bob E. Busking, The Hague, Netherlands, assignor to Shell Oil Company, New York, N.Y., a corporation of Delaware
Filed Feb. 4, 1966, Ser. No. 525,201
Claims priority, application Netherlands, Apr. 27, 1965, 65—5,345
8 Claims. (Cl. 114—230)

ABSTRACT OF THE DISCLOSURE

A floating storage unit for loading or unloading tankers off-shore. The unit includes a floating storage vessel having a rotatable member fixed to one end which in turn is journalled to a fixed non-rotatable member anchored to the ocean floor. A tanker may be moored alongside the storage vessel and may rotate in a 360° arc with the storage vessel to present the minimum resistance to wind and current forces during loading or unloading of tankers.

---

The invention relates to a floating unit for the storage of a fluid such as crude oil.

The object of the invention is to provide a simple unit floating on the water for the temporary storage of a fluid, which unit is of simple and inexpensive design, with loading and unloading of fluid from or into tankers being possible in a simple manner. Such a unit may, for example, be necessary for the temporary storage of the crude oil produced by off-shore oil wells. The oil produced from the various wells is temporarily stored in the neighborhood of the wells and an amount of the stored oil is withdrawn at regular intervals by a tanker.

The unit according to the invention comprises a vessel provided with storage tanks, a rotatable member fixed near one end of the vessel, a non-rotatable member journalled to the rotatable member and supported thereby in such a way that the members can rotate in relation to one another around a vertical axis to permit the vessel to rotate 360°, anchoring means on the non-rotatable member for securing an anchoring system, such as, for example, anchor chains or cables, at least one supply flowline firmly secured to the non-rotatable member and at least one loading flowline secured to the vessel and leading to the vessel's tanks, and a swivel coupling which rotatably interconnects the said lines.

The rotatable and non-rotatable members can be so mounted in relation to the vessel that during normal operation of the unit the bodies are maintained above the water level.

The means for securing the anchoring system may, for example, be anchor chains or cables secured to the underside of the second body.

The invention will now be explained with reference to the drawings in which:

FIGURE 1 is a cross-sectional side view of the proposed storage unit; and,

FIGURE 2 is a top-plan view of the proposed storage unit, a tanker being moored alongside the said unit.

The storage unit comprises a vessel indicated generally at 1, provided with storage tanks 2. A steel structure 3 is firmly secured to one end of the vessel 1, for example, to the bow. A rotatable member 4 is fixed to the free end of the steel structure. A non-rotatable member 5 is rotatably secured to the member 4 in such a way that the members 4 and 5 can rotate in relation to one another and permit the vessel to rotate in a 360° arc.

A supply flowline 6 is firmly secured to the member 5 and a loading flowline 7 is secured to vessel 1; flowline 7 leading to the tanks 2 of the vessel 1. The non-rotatable member 5 is provided on the underside with attaching means 8 in the form of eyes for the securing thereto of anchor cables or chains 9. Anchor chains 9 are connected at one end to the eyes 8. The other ends of the chains are attached to the seabed (not shown) by means of anchors (not shown) in a conventional manner. The flowlines 6 and 7 are rotatably interconnected by means of a swivel coupling 10. The other end of the supply flowline 6 communicates with the oil supply by means of a hose or flowline 11. As can be seen from the drawing the members 4 and 5 in the embodiment shown are situated above the surface of the water 12. Although this arrangement is preferable, it is of course also possible to situate the bodies 4 and 5 lower so that they are wholly or partially covered by the water without departing from the scope of the invention.

In FIGURE 2 a tanker 13 is moored alongside the vessel 1 by means of cables 18. On the side of the vessel 1 buffers 14 are secured to prevent damage to the vessel 1 or the tanker 13. As shown, transfer flowlines 15 of the vessel 1 are coupled to flowlines 16 of the tanker 13. The transfer flowlines 15 communicate with the tanks 2 of the vessel 1 and the flowlines 16 communicate with the tanks 17 of the tanker 13.

The use of the unit will now be described as follows:

The vessel 1 is anchored, by means of the anchor chains 9 and anchors secured thereto, for example, in the neighborhood of a number of off-shore oil wells. As a result of being anchored in this special manner, the vessel 1 will adopt such a position as to offer minimum resistance to wind and current forces. The oil produced by the oil wells flows via hose or flowline 11, supply flowline 6, swivel coupling 10 and loading flowline 7 to the tanks 2 of the vessel 1. The produced oil is thus stored in the tanks 2. Because of the swivel coupling 10 it is possible to continue supplying oil even when the vessel 1 is in the process of altering its position as a result of a change in the direction of wind and current forces.

Once the tanks 2 of the vessel 1 have been wholly or substantially filled with oil a tanker 13 is moored alongside the vessel 1 by means of cables 18. The flowlines 15 and 16 are coupled to one another, whereupon oil is pumped from the tanks 2 to the tanks 17 of the tanker 13. After the tanks 17 of the tanker 13 have been pumped full the lines 15 and 16 are uncoupled again and the tanker 13 departs to deliver the oil to its destination.

Subsequently, when the tanks 2 of the vessel 1 are refilled in the manner described above with oil produced by the oil wells situated nearby, a tanker again withdraws and transports the produced oil, thus repeating the loading cycle.

If desired, the vessel 1 can be provided with a landing platform 19 for helicopters.

In addition, a platform 20 can be secured to the body 4 for purposes of repair and inspection.

In order to turn the vessel 1 in a desired direction when a tanker 13 is approaching or departing, the vessel 1 can, if desired, be provided with propellers 21 situated transversely to a line drawn between the vertical axis of rotation of the vessel and the vessel itself.

It is advisable to provide shock absorbers 22, in the steel structure 3 to absorb horizontal shocks between the vessel 1 and the anchoring system. These shock absorbers can, for example, comprise metal or rubber springs or be of hydraulic or pneumatic design. The shock absorbers may also be located in the non-rotatable member 5.

In order to adjust the length of the anchor cables or chains to varying water levels in a simple manner, it is advisable to provide means (not shown) in the non-rotatable member 5 for hauling in or paying out the cables or chains 9. These may be, for example, suitable winches.

I claim as my invention:

1. A floating unit for the storage of a fluid such as crude oil comprising:
   a floating storage vessel having at least one fluid storage tank and positioned on a body of water,
   a rotatable member rigidly fixed to said vessel and carried thereby outboard thereof above the surface of said body of water,
   a substantially non-rotatable member journalled to said rotatable member and supported thereby to permit said vessel to rotate 360° about a substantially vertical axis,
   anchoring means secured to said non-rotatable member and extending to the floor of said body of water for anchoring said non-rotatable member to said floor in a substantially non-rotatable manner,
   at least one supply flowline extending up through said body of water and attached to said non-rotatable member,
   at least one loading flowline having one end in communication with said storage tank in said vessel, and
   a flowline swivel coupling rotatably interconnecting the other end of said loading flowline with said supply flowline about a vertical axis.

2. In combination with a floating unit as defined in claim 1:
   a tanker ship positioned alongside of said vessel,
   mooring means for mooring said tanker to said vessel,
   at least one transfer flowline having one end thereof in communication with said storage tank in said vessel and the other end thereof connectable to said tanker to provide transfer of fluid from said vessel to said tanker ship.

3. A combination as defined in claim 2 wherein said vessel is elongated and said rotatable member is fixed to one end of said vessel so that the longitudinal axis of said vessel extends radially outward from said vertical axis of rotation.

4. A combination as defined in claim 2 including a shock absorbing means interconnected between said vessel and said non-rotatable member to absorb horizontal shock therebetween.

5. A combination as defined in claim 2 wherein said vessel is provided with at least one propeller acting transversely to a line extending from said non-rotatable member to said vessel to thereby rotate said vessel about said non-rotatable member.

6. A floating structure as defined in claim 1 wherein said vessel is elongated and said rotatable member is fixed to one end of said vessel so that the longitudinal axis of said vessel extends radially outward from said vertical axis of rotation.

7. A floating unit as defined in claim 1 including a shock absorbing means interconnected between said vessel and said non-rotatable member to absorb horizontal shock therebetween.

8. A floating unit as defined in claim 1 wherein said vessel is provided with at least one propeller acting transversely to a line extending from said non-rotatable member to said vessel to thereby rotate said vessel about said non-rotatable member.

References Cited

UNITED STATES PATENTS

| | | | |
|---|---|---|---|
| 2,839,021 | 6/1958 | Patterson | 114—0.5 |
| 3,086,367 | 4/1963 | Foster | 9—8 X |
| 3,093,167 | 6/1963 | McCammon | 114—230 X |
| 3,155,069 | 11/1964 | Ross | 9—8 X |
| 3,191,201 | 6/1965 | Richardson et al. | 9—8 |

MILTON BUCHLER, *Primary Examiner.*

FERGUS S. MIDDLETON, *Examiner.*

T. M. BLIX, *Assistant Examiner.*